Sept. 13, 1949.　　　　G. A. TUTTLE　　　　2,481,799
AIRCRAFT WITH BEATING WINGS
AND TILTABLE PROPELLERS
Filed June 5, 1946　　　　　　　　　　　3 Sheets-Sheet 3
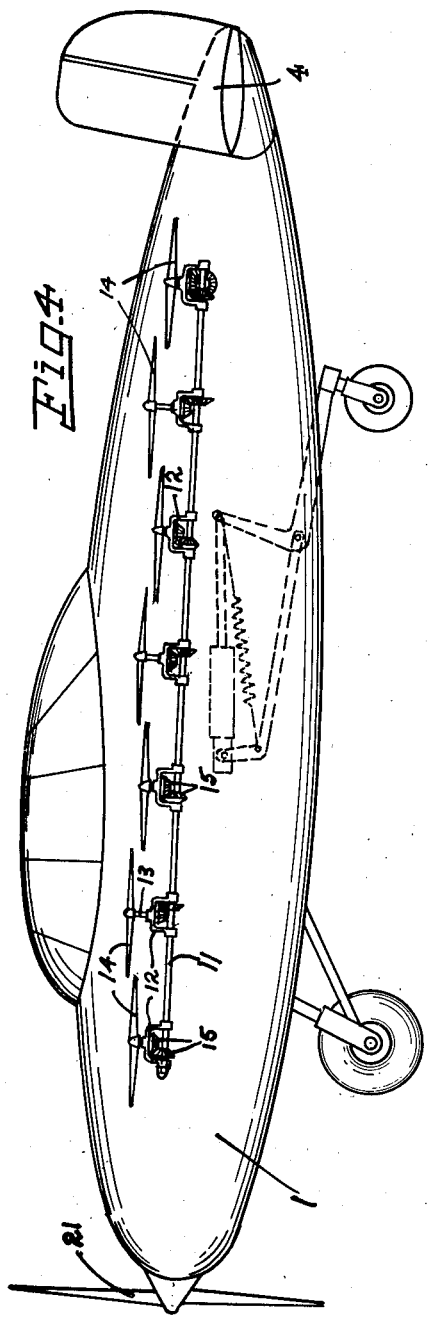
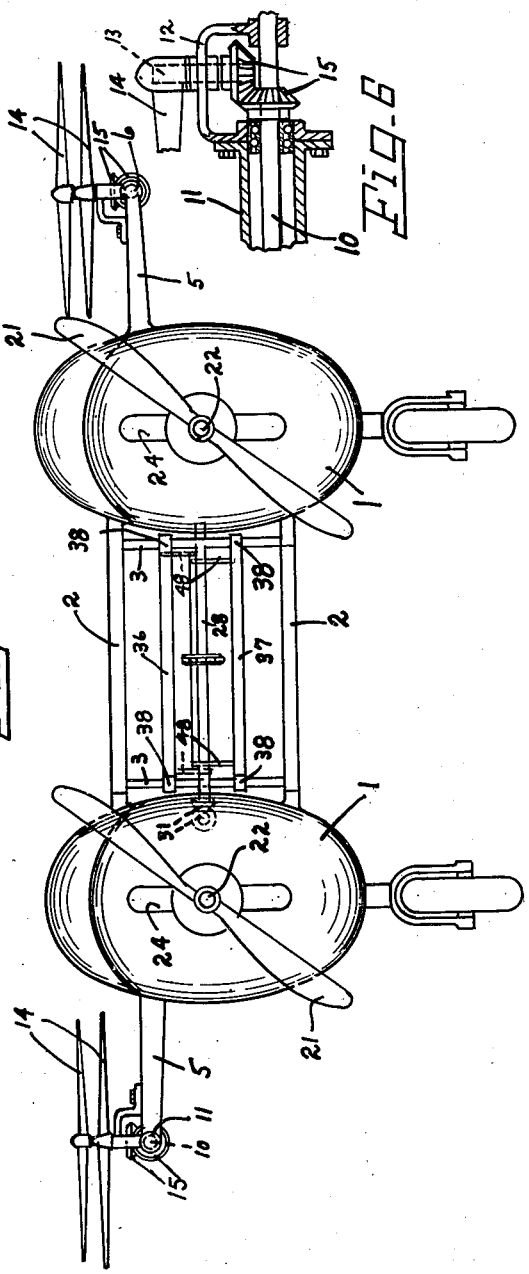
INVENTOR
George A. Tuttle
BY Glenn L. Fish
ATTORNEY Patented Sept. 13, 1949

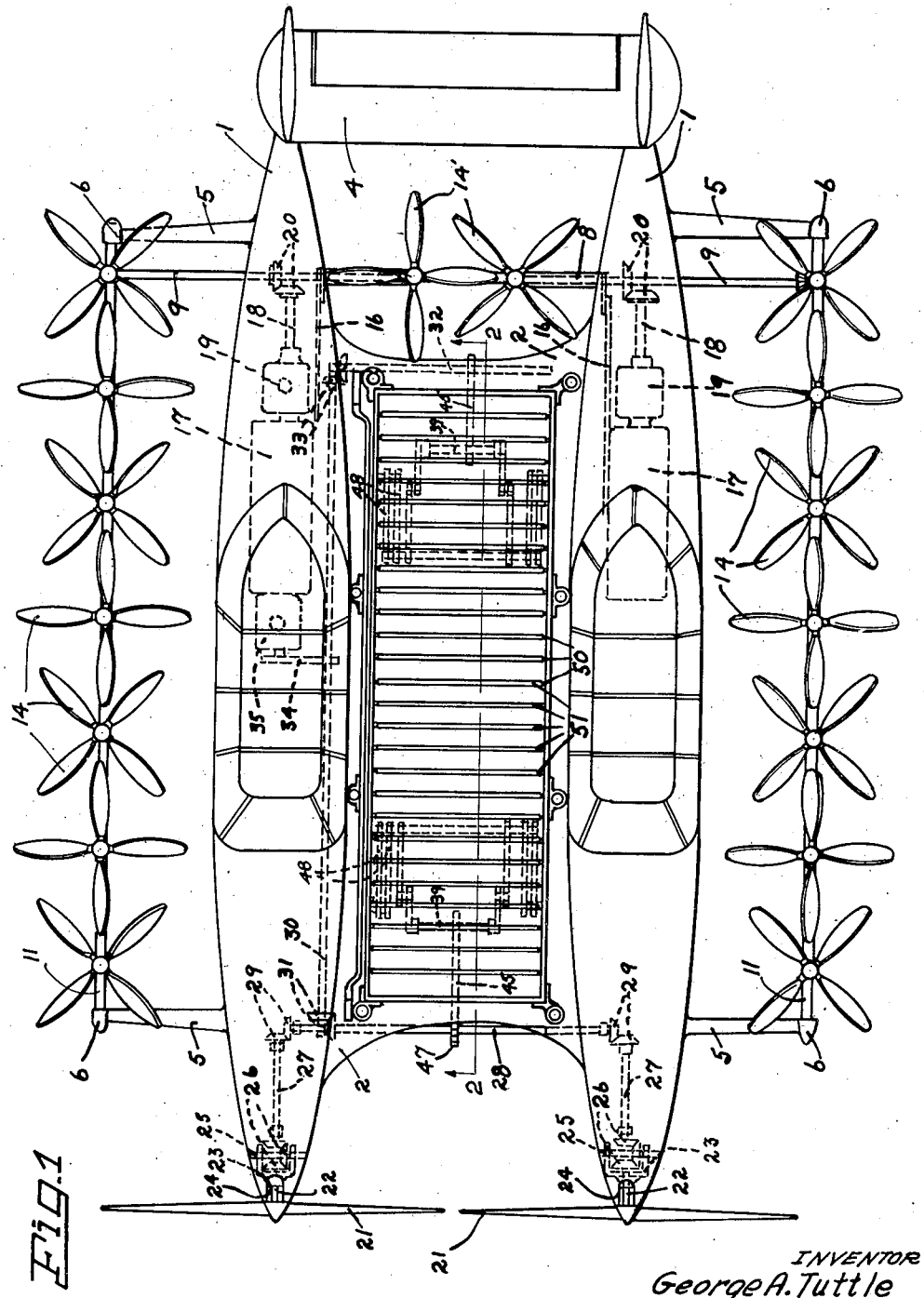

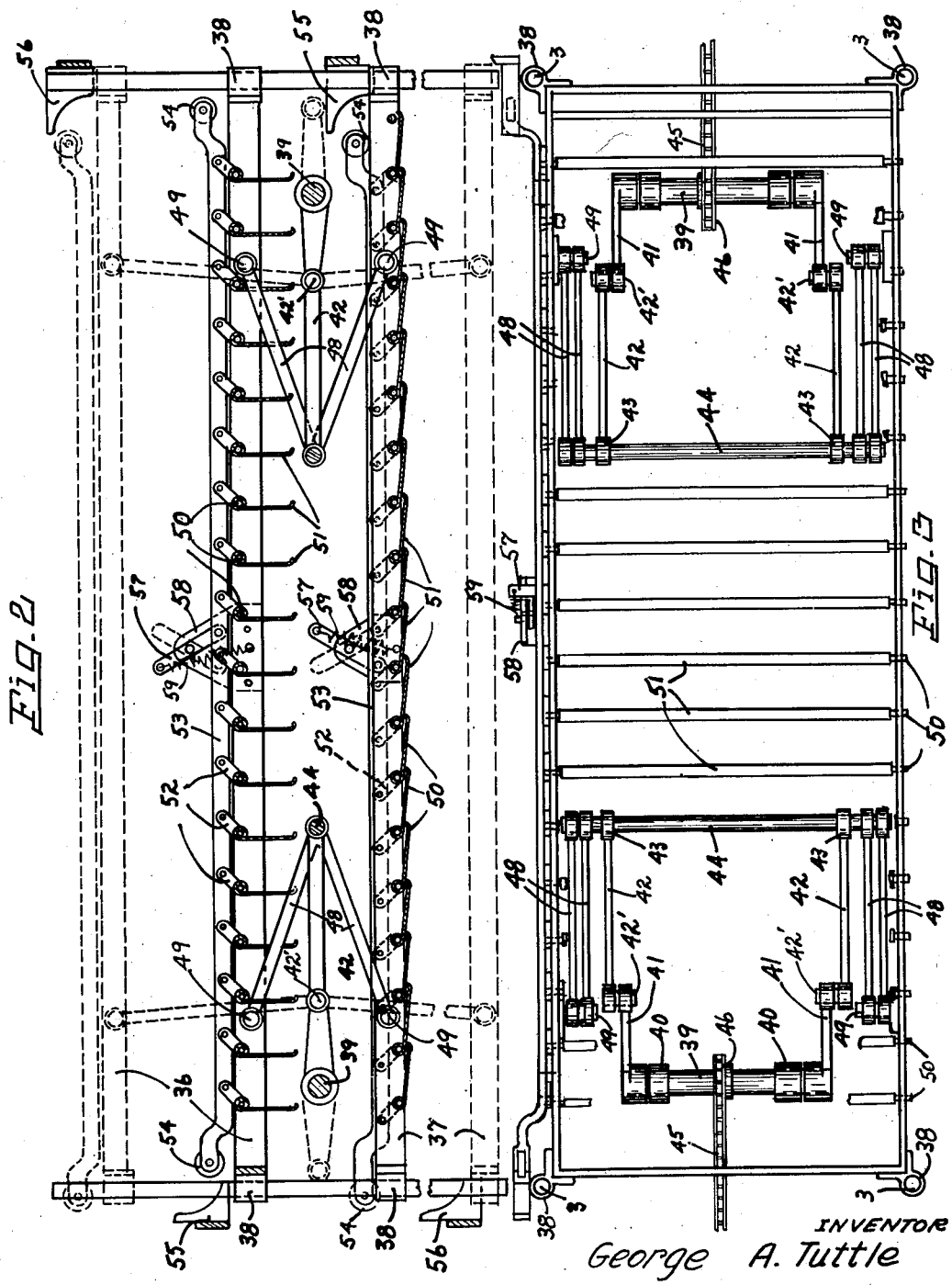

2,481,799

UNITED STATES PATENT OFFICE 2,481,799

AIRCRAFT WITH BEATING WINGS AND TILTABLE PROPELLERS

George A. Tuttle, Anatone, Wash.

Application June 5, 1946, Serial No. 674,524

8 Claims. (Cl. 244—22)

This invention relates to aircraft and it is one object of the invention to provide an aircraft having improved means for propelling the same through the air and for effecting take-offs and landings.

Another object of the invention is to provide the aircraft with propellers so arranged that they may impart a direct vertical lift to the aircraft and also be adjusted to such positions that they will drive the aircraft forwardly after a desired altitude has been attained.

Another object of the invention is to provide the aircraft with propellers spaced from outer sides of a pair of fuselages which are disposed in transverse spaced relation to each other, vanes or air foils being mounted between the fuselages and carried by transverse shafts which pivotally mount the vanes for vertical swinging movement and cause them to have beating action which assists in controlling vertical movements of the aircraft.

Another object of the invention is to provide an aircraft wherein vanes between the spaced fuselages are arranged as upper and lower sets, the vanes of one set moving to a vertical position while the vanes of the other set move to a horizontal position.

Another object of the invention is to provide an aircraft wherein the propellers at outer sides of the fuselages are arranged in rows, the propellers of each row being spaced from each other longitudinally of the aircraft and so geared to drive shafts that adjoining propellers turn in opposite directions and thus prevent the aircraft from having a tendency to move in a circular path when in flight.

Another object of the invention is to provide the aircraft with rear propellers which may be disposed vertically for vertical lift or shifted to a position in which they assist in driving the aircraft forwardly.

The invention is illustrated in the accompanying drawings wherein:

Fig. 1 is a top plan view of the improved aircraft.

Fig. 2 is a longitudinal sectional view taken along line 2—2 of Figure 1.

Fig. 3 is a top plan view of the vanes mounted between the fuselages.

Fig. 4 is a side view of the aircraft.

Fig. 5 is a front view of the aircraft.

Fig. 6 is a fragmentary sectional view of drive mechanism for the propellers mounted along sides of the fuselages.

This aircraft has been shown provided with a pair of fuselages I which are spaced transversely from each other, it being understood that while two fuselages have been shown in the present disclosure any number desired may be provided. Upper and lower frames 2 are mounted between the fuselages to hold them in spaced relation to each other and these frames, which are open frames, carry vertically disposed posts 3 located at opposite sides of front and rear ends of the frame. A tail assembly 4 is mounted between rear ends of the fuselages and includes in its construction the usual vertical and horizontal stabilizers and rudders provided in tail assemblies of this type.

Arms 5 project from outer sides of the fuselages near front and rear ends thereof and have sockets 6 at their outer ends in which fit ends of tubes 1. A similar tube 8 is mounted between rear portions of the fuselages forwardly of the tail assembly and through the tubular casing 8 extends a shaft 9 having its ends geared to shafts 10 mounted through tubular casings 11 carried by the sockets 6 of the arms 5. The tubular casings 8 and 11 are formed in sections between which are mounted yokes 12, as shown in Figure 6, and through these yokes are rotatably mounted vertical shafts 13 carrying propellers 14 and 14'. The shafts 13 are rotated from the shaft 10 by intermeshing gears 15 carried by these shafts, the gears being arranged as shown in Figure 4 so that adjoining propellers will be turned in opposite directions and the aircraft thus prevented from having a tendency to move in a circular path. It should also be noted that the propellers are vertically staggered so that ends of their blades may pass in overlapping relation to each other instead of striking and causing damage to each other. The rear tube or casing 8 is mounted for turning adjustment about the shaft 9 and at its ends carries levers 16 which extends longitudinally in the fuselages, and when either of the levers is moved to rotate the tubular casing 8 the propellers 14' will be swung from a vertical position towards a horizontal position. Therefore these rear propellers may be moved from the position shown in Figure 1 in which they assist the side propellers to lift the aircraft to a position in which they will urge the aircraft forwardly, or to positions in which they will raise or depress the rear end of the aircraft and cause it to assume positions for climbing or gliding to a landing. The rear shaft 9 is driven from engines 17 in the fuselages by shafts 18 which extend rearwardly from transmissions 19 and are connected with shaft 9 by intermeshing gears 20.

At front ends of the fuselages are propellers 21 carried by shafts 22 which are rotatably mounted through yokes 23. The shafts 22 pass through vertical slots 24 formed in the fuselages and since the yokes are pivoted upon the shafts 25 they may be tilted vertically and angularly by means, not shown, to adjust pull of the front propellers. Beveled gears 26 connect shafts 22 with shafts 27 which extend longitudinally of the fuselages and have their rear ends connected with a transversely extending shaft 28 by gears 29. The shaft 28 extends between the fuselages with its end portions entering the fuselages and one end portion of the shaft is connected with a shaft 30 by gears 31. This shaft extends longitudinally of one fuselage and at its rear end is connected with a transversely extending shaft 32 by gears 33. Therefore the front and rear shafts 28 and 32 are both driven from the shaft 30, the shaft 30 being driven from one of the engines 17 by a sprocket chain 34 trained about sprocket wheels carried by the shaft 30 and by the shaft of a transmission 35 at the front end of the last mentioned engine. It will thus be seen that both engines drive the shaft 9 and that one engine drives the shafts 28 and 32 and from the shaft 28 drives the front propellers 21.

Upper and lower frames 36 and 37 occupy space between the fuselages and at opposite sides or corners of their ends carry sleeves 38 which slidably fit about the posts 3 and mount the frames for vertical movement. Crank shafts 39 which are rotatably mounted in bearings 40 carried by the fuselages extend transversely of the frames 36 and 37 between the same and these shafts carry arms 41 which project from ends of the shafts radially thereof and have their inner ends pivoted to links 42 by pins 42'. These links longitudinally of the aircraft and at their inner ends carry bearings 43 through which shafts 44 are mounted. Sprocket chains 45 are trained about sprocket wheels 46 and 47 carried respectively by the shafts 39 and by shafts 28 and 32 so that rotary motion will be transmitted to the shafts 39 and the shafts 44 shifter continuously back and forth longitudinally of the aircraft. Links 48 which are loosely mounted about ends of the shaft 44 extend towards ends of the aircraft in diverging relation to each other and their outer ends are loosely engaged about pins 49 on frames 36 and 37 so that they will be pivotally connected with end portions of side bars of the frames 36 and 37 and these frames shifted vertically in opposite directions as the shafts 44 are shifted longitudinally of the aircraft.

Rods 50 are carried by the frames 36 and 37 transversely thereof and upon these rods are rigidly mounted vanes or stiff metal plates 51 of such length that when they are in a horizontal position space between the rods will be closed and the vanes form a continuous air-engaging surface as shown in frame 37 in Figure 2. Links 52 connect the rods 50 with bars 53 which extend longitudinally of the frames 36 and 37 at one side thereof and at their ends carry rollers 54 for engaging cams 55 and 56. When the frames 36 and 37 are shifted towards each other the cams 55 engage the rollers and shift the bars 53 longitudinally so that the rods 50 will be turned to move the vanes of the upper frame 36 to a depending vertically disposed position and the vanes of the lower frame to the horizontally extending open position. When the frames are shifted away from each other the cams 56 engage the rollers and shift the bars 53 longitudinally in an opposite direction and the rods 50 will be turned to move the vanes of the upper frame to a horizontal position and the vanes of the lower frame to a vertical position. Latch levers 57 consisting of metal bars are pivoted to plates 58 and have their lower ends pivoted to the bars 53 and their upper ends connected with springs 59 which have their lower ends connected with the plates. The latch bars or levers move past a dead center when the bars 53 are moved longitudinally to open or close the vanes and prevent accidental longitudinal movement of the bars and unintentional movement of the vanes to opened or closed positions.

When the aircraft is in operation and is to take off the engines are started and the propellers rotated. The propellers 14 and 14' lift the aircraft from the ground and when the desired altitude has been reached they are angularly adjusted so that they will cause the aircraft to move forwardly. The propellers 21 pull the aircraft forwardly and by angularly adjusting the rear propellers 14' the aircraft may be caused to nose over into a landing glide or assume a climbing incline. Upward and downward movement of the frames 36 and 37 cause the vanes to alternately open and close with a flapping movement and assist in raising the aircraft. The vanes may also aid in controlling movement of the aircraft to a landing and after a landing has been made the vertically disposed vanes will act as wind brakes and retard forward movement of the aircraft.

Having thus described the invention, what is claimed is:

1. An aircraft comprising fuselages spaced transversely from each other, upper and lower frames between the fuselages mounted for vertical movement towards and away from each other, vanes extending transversely of said frames and pivotally mounted for vertical swinging movement from a vertical position to a horizontal position in which adjoining vanes close the frames and prevent movement of air vertically through the same, propellers at front ends of the fuselages, propellers between the rear end portions of the fuselages mounted for angular adjustment, propellers at outer sides of the fuselages spaced from each other longitudinally thereof and mounted for angular adjustment, and means for driving the propellers.

2. An aircraft comprising fuselages spaced transversely from each other, upper and lower frames between the fuselages mounted for vertical movement towards and away from each other, vanes extending transversely of said frames and pivotally mounted for vertical swinging movement from a vertical position to a horizontal position in which adjoining vanes close the frames and prevent movement of air vertically through the same, bars extending longitudinally of said frames, links connecting the bars with the vanes for swinging the vanes to vertical and horizontal positions as the bars are shifted longitudinally, cams disposed in position for engagement by ends of the bars to shift the bars longitudinally during vertical movement of the frames, means for effecting movement of the frames in opposite directions towards and away from each other, front and rear propellers and propellers along sides of the fuselages, and means for rotating said propellers.

3. An aircraft comprising fuselages spaced transversely from each other, upper and lower frames between the fuselages mounted for vertical movement towards and away from each other, vanes extending transversely of said frames and pivotally mounted for vertical swinging movement from a vertical position to a horizontal position in which adjoining vanes close the frames and prevent movement of air vertically through the same, bars extending longitudinally of said frames, links connecting the bars with the vanes for swinging the vanes to vertical and horizontal positions as the bars are shifted longitudinally, cams disposed in position for engagement by ends of the bars to shift the bars longitudinally during vertical movement of the frames, shafts rotatably mounted transversely of the fuselages adjacent front and rear ends thereof, an engine, a counter shaft extending longitudinally of one fuselage and driven from said engine and geared to the cross shafts, crank shafts rotated from the cross shafts, shafts extending transversely of the aircraft between the fuselages and shiftable longitudinally of the aircraft, links connecting the last mentioned shafts with arms of the crank shafts, links extending from the last mentioned shafts in diverging relation to each other and connected with the frames for shifting the frames vertically in opposite directions when the last mentioned shafts are shifted longitudinally of the aircraft, propellers associated with the fuselages, and means for rotating said propellers.

4. An aircraft comprising fuselages spaced transversely from each other, upper and lower frames between the fuselages mounted for vertical movement towards and away from each other, vanes extending transversely of said frames and pivotally mounted for vertical swinging movement from a vertical position to a horizontal position in which the adjoining vanes close the frames and prevent movement of air vertically through the same, bars extending longitudinally of said frames, links connecting the bars with vanes for swinging the vanes to vertical and horizontal positions as the bars are shifted longitudinally, cams disposed in position for engagement by ends of the bars to shift the bars longitudinally during vertical movement of the frames, shafts rotatably mounted transversely of the fuselages adjacent front and rear ends thereof, an engine, a counter shaft extending longitudinally of one fuselage and driven from said engine and geared to the cross shafts, crank shafts rotated from cross shafts, shafts extending transversely of the aircraft between the fuselages and shiftable longitudinally of the aircraft, links connecting the last mentioned shafts with arms of the crank shafts, links extending from the last mentioned shafts in diverging relation to each other and connected with the frames for shifting the frames vertically in opposite directions when the last mentioned shafts are shifted longitudinally of the aircraft, shafts rotatably mounted along outer sides of the fuselages, a shaft rotatably mounted transversely of the rear portions of the fuselages and geared to the side shafts, tubes enclosing the shafts and formed of sections connected by yokes, propeller shafts rotatably carried by the yokes and geared to the shafts in the tubes, propellers carried by the propeller shafts, and means for turning the tubes to tilt the yokes and angularly adjust the propellers.

5. An aircraft comprising fuselages spaced transversely from each other, main frames between said fuselages, posts carried by the main frames and extending vertically, upper and lower vane-carrying frames having sleeves fitting about the posts and mounting the vane-carrying frames for vertical sliding movement, rods rotatably mounted across the vane-carrying frames, vanes fixed to said rods for movement from a horizontally extending closed position to depending vertically disposed opened positions, bars slidable longitudinally of the vane carrying frames and connected with the rods to turn the same and swing the vanes vertically to horizontal and vertical positions when the bars are shifted longitudinally, an engine, means driven from the engine to shift the vane-carrying frame vertically in opposite directions towards and away from each other, propellers, drive shafts for the propellers, and means for transmitting rotary motion from the engine to the propellers.

6. An aircraft comprising fuselages, a structure maintaining the fuselages in transverse spaced relation to each other and including vertical posts, upper and lower frames having sleeves fitting about the posts and mounting the frames for vertical movement, vanes extending transversely in said frames and pivotally mounted for vertical swinging movement from a horizontal position closing a frame to a vertically extending opened position, bars shiftable longitudinally of the frames and connected with the vanes for pivotally moving the vanes to adjusted positions, means for moving the bars longitudinally during vertical movement of the frames, means for shifting the frames towards and away from each other and effecting vertical swinging movements of the vanes in opposite directions, and propellers for imparting movement to the aircraft.

7. An aircraft comprising fuselages, a structure maintaining the fuselages in transverse spaced relation to each other and including vertical posts, upper and lower frames having sleeves fitting about the posts and mounting the frames for vertical movement, vanes extending transversely in said frames and pivotally mounted for vertical swinging movement from a horizontal position closing a frame to a vertically extending opened position, means for shifting the frames vertically in opposite directions, bars shiftable longitudinally of the frames and connected with the vanes for swinging the vanes in opposite directions to opened and closed positions, cams mounted in position for engaging ends of the bars during vertical movement of the frames and shifting the bars longitudinally during vertical movement of the frames, and propellers associated with the fuselages.

8. An aircraft comprising fuselages, a structure maintaining the fuselages in transverse spaced relation to each other and including vertical posts, upper and lower frames having sleeves fitting about the posts and mounting the frames for vertical movement, vanes extending transversely in said frames and pivotally mounted for vertical swinging movement from a horizontal position closing a frame to a vertically extending opened position, an engine, means for shifting the frames vertically in opposite directions including front and rear shafts rotatably mounted transversely of the aircraft between the fuselages and driven from the engine, means actuated during vertical movement of the frames for imparting vertical swinging movement to the vanes during vertical movement of the frames, propellers at front ends of the fuselages driven from one transversely extending shaft, and propellers along the sides and across the rear end of the aircraft driven from the motor.

GEORGE A. TUTTLE.

REFERENCES CITED

The following references are of record in the file of this patent:

UNITED STATES PATENTS

| Number | Name | Date |
|---|---|---|
| 1,806,870 | Bott | May 26, 1931 |
| 2,023,334 | Marmonier | Dec. 3, 1935 |